United States Patent [19]
Rebentisch

[11] 3,818,860
[45] June 25, 1974

[54] ELECTRICALLY HEATED CONTINUOUS BAND APPLICATOR

[75] Inventor: Hans Waldemar Rebentisch, Frankfurt am Main-Bonames, Germany

[73] Assignee: U. S. M. Corporation, Boston, Mass.

[22] Filed: Mar. 22, 1973

[21] Appl. No.: 344,054

[30] Foreign Application Priority Data
Mar. 22, 1972 Germany.......................... 2213974

[52] U.S. Cl................ 118/202, 118/203, 118/257, 118/261, 100/93 PR, 219/244, 219/388, 219/421, 219/469
[51] Int. Cl............................................. B05c 1/14
[58] Field of Search .......... 219/216, 388, 421, 469, 219/521, 243, 244, 470, 471; 34/1; 83/171; 100/93 PR; 118/60, 202, 203, 257, 637, 641, 261; 117/21, 112

[56] References Cited
UNITED STATES PATENTS

| | | | |
|---|---|---|---|
| 1,311,121 | 7/1919 | Haefcly................................ | 118/60 |
| 1,401,303 | 12/1921 | Baldwin............................ | 219/552 X |
| 2,526,650 | 10/1950 | Gaibel................................ | 83/171 |
| 2,684,047 | 7/1954 | Walker............................ | 118/257 X |
| 2,711,781 | 6/1955 | Langer............................ | 219/388 X |
| 2,868,162 | 1/1959 | Knain............................ | 117/112 X |
| 2,911,942 | 11/1959 | Gross................................ | 118/202 |
| 3,067,718 | 12/1962 | Kraft................................ | 118/257 X |
| 3,162,561 | 12/1964 | Farkas............................ | 219/244 X |
| 3,259,004 | 7/1966 | Chisholm............................ | 83/171 |
| 3,273,531 | 9/1966 | Boothroyd et al.................. | 118/202 |
| 3,281,576 | 10/1966 | Cooper et al........................ | 219/421 |
| 3,367,261 | 2/1968 | Kashiwagi........................ | 100/93 PR |
| 3,637,976 | 1/1972 | Ohta et al............................ | 219/216 |
| 3,666,247 | 5/1972 | Banus................................ | 219/388 X |
| 3,669,706 | 6/1972 | Sanders et al....................... | 219/216 |

FOREIGN PATENTS OR APPLICATIONS

93,561 3/1922 Switzerland......................... 219/421

Primary Examiner—Volodymyr Y. Mayewsky
Attorney, Agent, or Firm—Ralph D. Gelling; Vincent A. White; Richard B. Megley

[57] ABSTRACT

An applicator for material, preferably hot-melt adhesive, has an endless band for heating the material and for applying the heated material to a workpiece. The band has an integral heating element for heating the band and is driven for movement along a longitudinal axis of the band. The material is received on the band and carried and heated by the band into material applying contact with the workpiece. In one embodiment, the band is magnetized to prevent separation of the material from the band prior to contact of the material with the workpiece.

2 Claims, 3 Drawing Figures

PATENTED JUN 25 1974

ELECTRICALLY HEATED CONTINUOUS BAND APPLICATOR

BACKGROUND OF THE INVENTION

Many industrial operations require deposition of a heated material on a workpiece. A common example is the deposition of hot-melt adhesive on a shoe part workpiece during manufacture of shoes. However, hot-melt adhesive is used in other such diverse industrial operations as the manufacture of fiberboard boxes and automobiles. Materials other than hot-melt adhesive are applied in a heated state in still other industrial operations. For example, beads of decorative thermoplastic material are deposited on workpieces for such diverse end uses as children's toys and women's handbags.

Heretofore known devices for applying such heated material have required apparatus for heating the material and separate apparatus for applying the material. Often such apparatus has had such mass as to have a heat content making impossible rapid regulation of the temperature of the material in the apparatus. The bulk of such massive applicators further makes difficult the application to the workpiece of only a narrow bead of material and even more difficult the application of adjacent narrow beads of material to the workpiece.

SUMMARY OF THE INVENTION

Accordingly, it is an object of the invention to provide an applicator for heating and applying material to a workpiece which combines the heating and applying means, can rapidly regulate the temperature of the material and can be constructed with a width approximating that of a narrow bead of material to be applied to the workpiece, for example, a few millimeters.

To this end, an applicator for material has an endless band for both heating the material as well as for applying the heated material to a workpiece. The band has an integral heater for heating the band which then heats material carried on the band. The band is driven for movement along a longitudinal axis of the band for carrying the material received on the band into material applying contact with the workpiece. Preferably, the band is of approximately the same width as the bead of material applied to the workpiece. In one embodiment, the band is magnetized to prevent separation of the material from the band prior to contact of the material with the workpiece, the material used in this embodiment, of course, being magnetic.

DESCRIPTION OF THE DRAWINGS

A preferred embodiment which is intended to be illustrative of and not a limitation on the invention will now be described with reference to the drawings, in which.

DESCRIPTION OF THE PREFERRED EMBODIMENT

Figure 1:
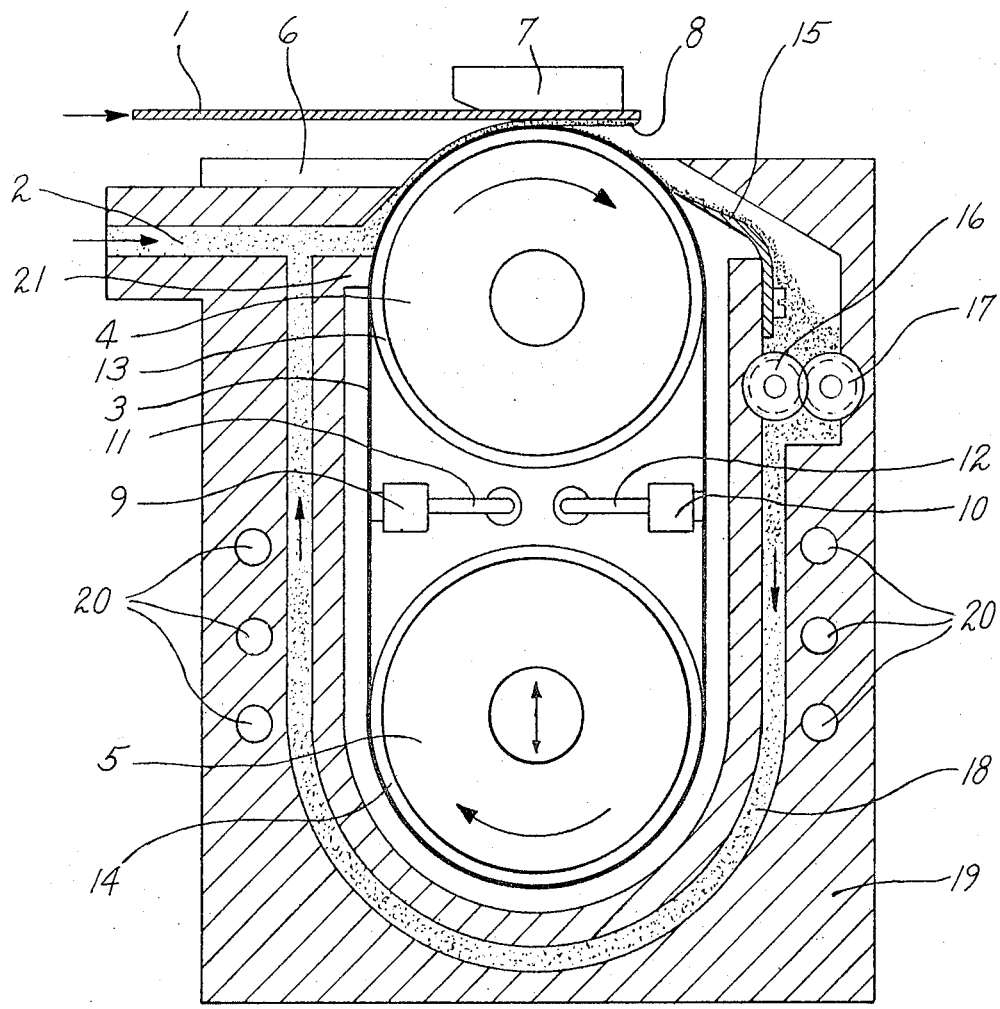
FIG. 1 is a view, partly in section, of the preferred embodiment.

The preferred embodiment shown in FIG. 1 is intended to apply heated hot-melt adhesive to a workpiece 1 of sheet material. Heat softened adhesive is supplied to the apparatus through a passageway 2 under sufficient pressure to urge the adhesive along the passageway and into engagement with an endless band 3, a portion of which is adjacent an upstream end of the passageway 2. The band is tensioned around two wheels 4 and 5 each mounted for rotation in the plane of FIG. 1, at least one wheel being rotationally driven in the direction indicated by the arrows on the wheels for imparting corresponding movement to the band. The band then moves about the wheels along its longitudinal axis. Adhesive received on the band at the passageway 2 is carried on the band past a doctor blade 6 for reducing the adhesive to a desired thickness and into contact with the workpiece. The workpiece is held in contact with the adhesive by a presser bar 7 to transfer a bead 8 of adhesive from the band to the workpiece.

The band is made from a material having sufficient electrical resistance to be resistance-heated by an electric current applied to the band by electric contacts 9 and 10 each engaging the band and supplied with electricity by electrical leads 11 and 12, respectively. The band thus forms an integral heating element for heating adhesive carried on the band to the workpiece. The band may be made of sufficiently low mass per unit length so as to have a sufficiently low heat content as to rapidly change temperature in response to changes in the heating electric current supplied to the band by the contacts. The band may also have a width substantially corresponding to the width of the bead of adhesive applied to the workpiece, for example, a few millimeters, so that another adjacent applicator may apply another bead of adhesive closely adjacent to the bead 8 applied by the band 3. Preferably, this embodiment is of modular construction so as to permit assembly of as many additional modular units extending out of the plane of FIG. 1 as desired.

The particular temperature to which the band heats the adhesive is, of course, determined by that desired for the particular hot-melt adhesive used. For some commercially available hot-melt adhesives a temperature of about 180° F. is appropriate. However, it may be desired to substantially overheat the adhesive for a brief time immediately prior to its application to a workpiece. For such application, the adhesive in the passageway 2 may be substantially at the usual application temperature and the band 3 used to substantially overheat the adhesive for a brief time determined by the speed with which the belt moves to carry the adhesive from the passageway 2 to the workpiece. Such overheating times may be less than five seconds or of other short duration.

The electric current supplied by the leads 11 and 12 may be alternating current from a transformer (not shown) at a relatively low voltage and high current to supply the relatively high power-rates which may be required to rapidly heat the adhesive on the band. The current from the transformer may be regulated by a potentiometer (not shown) to heat the band to a temperature such that the band conducts sufficient heat into the adhesive on the band to provide the desired application temperature to the adhesive. A desirable thin construction of the band, giving it a low mass and heat content, permits the band to rapidly heat and cool in response to the heating current supplied to the band. For example, during stop-start operation in which movement of the band may be stopped, overheating of the adhesive on the band can be avoided. The band may be electrically insulated from other portions of the embodiment by an insulating strips or tires 13 and 14 between periphery of the wheels 4 and 5, respectively, and the band. Other portions of the apparatus may also be appropriately electrically insulated, for example, a sealing member 25.

To maintain driving engagement of the wheels 4 and 5 with the band, the wheel 5 is linearly movable toward and away from the wheel 4 as indicated by the arrow centrally located on wheel 5. Preferably, the wheel 5 is resiliently urged away from the wheel 4 to tension the band between the wheels.

To prevent any adhesive which may continue to adhere to the band after contact of the adhesive with the workpiece from entering the apparatus and fouling its operation, a doctor blade 15 engages the band to scrape the potentially remaining adhesive from the band. The doctored-off adhesive flows under gravity to a pair of gears 16 and 17 rotationally driven to form a pump in a known manner. The pump forces the adhesive through a passageway 18 extending through a housing 19 of the apparatus back to the adhesive supply passageway 2 where it co-mingles with the adhesive in the passageway 2 to be again received on the band. To maintain the adhesive in the passageway 18 in a heated, fluid state, heating ducts 20 are provided in the housing adjacent the passageway 18. The ducts 20 may circulate a heated fluid about the housing, receive appropriately insulated electric heating elements or provide heat to the housing in other known manners.

Figure 2:
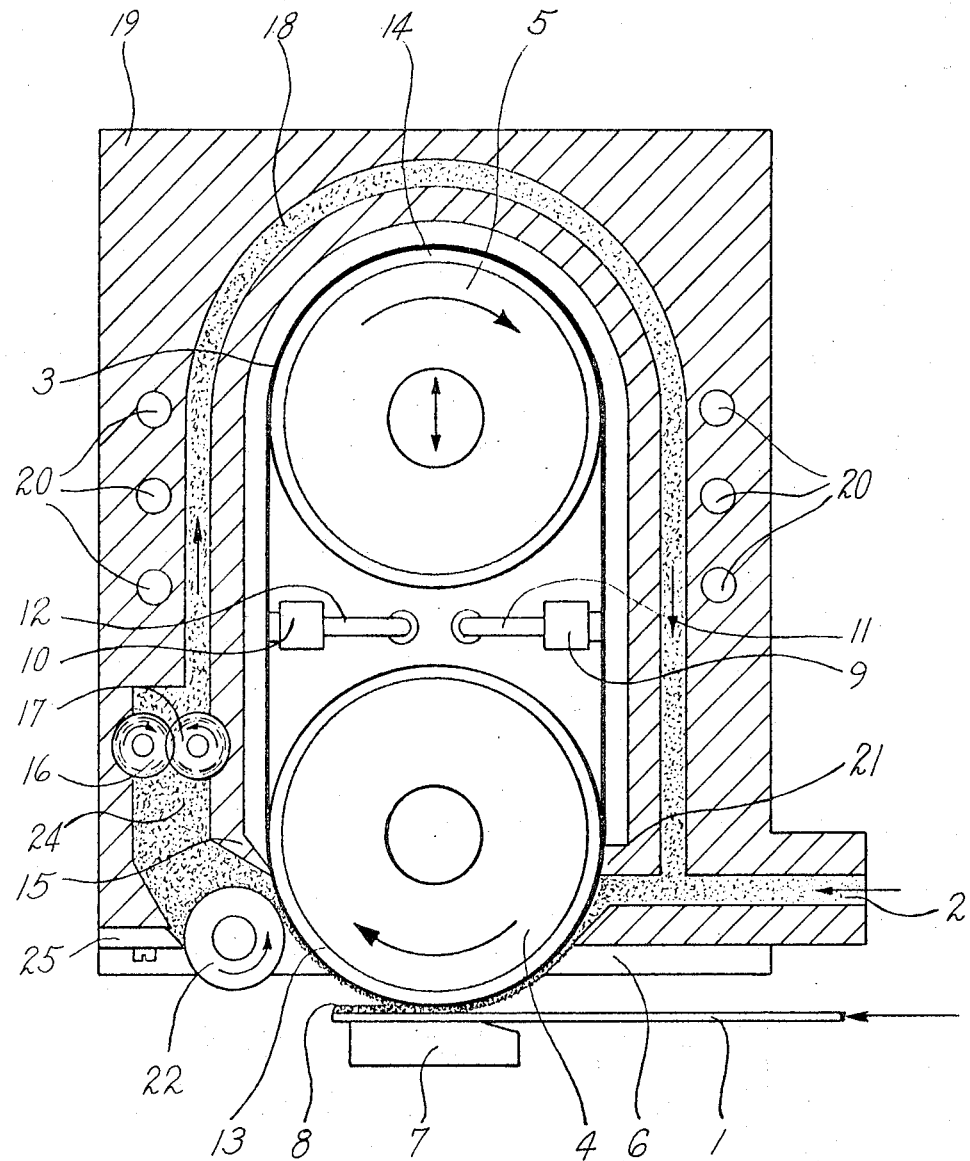
FIG. 2 is a view, partly in section, of another embodiment.

FIG. 2 shows an alternative embodiment of the invention having every portion of the apparatus described in relation to FIG. 1 as preferred. However, the embodiment shown in FIG. 2 is intended to carry material, preferably hot-melt adhesive, from the passageway 2 downward to the workpiece 1. The adhesive remaining on the band after adhesive contact with the workpiece will then not flow under gravity from the doctor blade 15 to the gears 16 and 17 of the pump. To overcome this problem an impeller roller 22 is mounted upstream relative to belt movement of the doctor blade 15 and slightly spaced from the band by, for example, a few tenths of a millimeter. The roller 22 is rotationally driven in the direction shown by the arrow on the roller to urge adhesive doctored from the band by the blade 15 through a portion 24 of the passageway 18 toward the gears 16 and 17 of the pump. A further doctor blade 25 is provided to prevent adhesive from being carried by the roller 22 outside of the apparatus.

In the use of some embodiments of the invention, the band may accelerate about a curve such as the periphery of the wheel 4 at such a rate as to cause the material on the band to separate from the band prior to its contact with the workpiece in a known manner often referred to as centrifugal force. Where the material applied by the band is magnetic, the band may be magnetized to magnetically hold the material on the band until it contacts the workpiece.

Some known plastic materials which are heat softenable for use in the applicator are magnetic. However, even if the desired material is not magnetic, it may be possible to provide such magnetic properties as to hold the material on the band without destroying other desirable properties of the material. For example, finely divided, highly magnetic iron may be dispersed through a non-magnetic adhesive to provide a magnetic property to an otherwise non-magnetic adhesive. The cohesive properties of the adhesive about the iron then hold the adhesive with the iron while leaving sufficient exposed adhesive surfaces for use of the adhesive.

Figure 3:
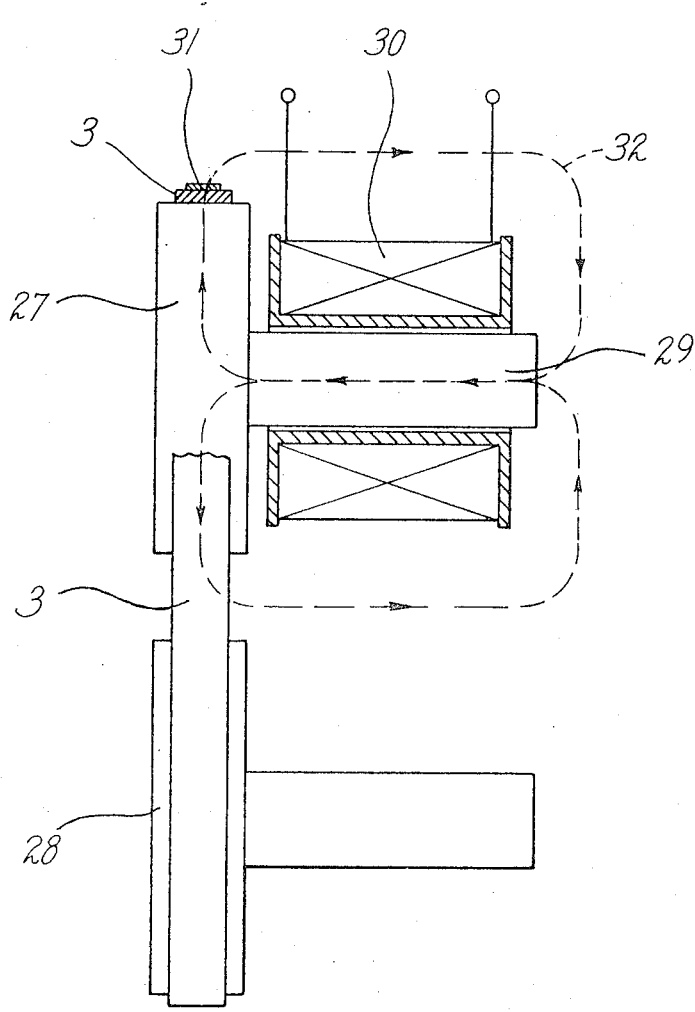
FIG. 3 is a side view of a portion of still another embodiment.

FIG. 3 shows an embodiment having apparatus for magnetically holding material on the band 3. The band is here preferably made of a highly magnetic material such as iron and is tensioned about rotating wheels 27 and 28 for movement along a longitudinal axis of the band. An axle 29 on which the wheel 27 is mounted for rotation is also made of a highly magnetic material such as iron. A magnetic field is impressed on the axle by an electromagnet 30 having electrical leads appropriately connected to a source of electricity. The electromagnet provides an electric field as indicated by the field lines 32 extending through the axle 29, wheel 27, band 3 and a strip 31 of adhesive carried on the band for application to the workpiece. As is known, the field lines return to an end of the axle 29 opposite the wheel 27 to complete a magnetic circuit and extend symmetrically about the rotational axis of the axle for the indicated, symmetrical geometry of construction.

Still other alternative embodiments are contemplated within the scope of the invention. For example, the electrical contacts providing electric current to the band may engage the wheels driving the band, which wheels then electrically communicate with the band. As another example, the band may be positioned about nonrotating posts over which it slides or be driven by nonrotating apparatus such as a pawl engaging ratchet teeth on the band. As still another example, the band may be made from an electrically nonconducting material having an electric heating element integrally embedded in the material. As still another example, the magnetic field may be provided by the electric current in the band. All these exemplary alternative embodiments and still others are intended within the scope of my invention defined by the following claims:

I claim:

1. A device for applying a hot-melt adhesive to a workpiece comprising:
   a. a continuous band, at least a portion of said continuous band being electrically conductive, said electrically conductive continuous band being mounted on rotating wheels which serve to tension and move said band about said wheels;
   b. means for supplying adhesive to the continuous band;
   c. means for directing a workpiece into contact with the adhesive carrying continuous band;
   d. means for applying an electrical voltage to the electrically conductive portion of the continuous band to heat said band; and
   e. means for removing and recirculating excess adhesive from the continuous band.

2. A device for applying a hot-melt adhesive to a workpiece as described in claim 1 wherein the continuous band is constructed having a relatively narrow width in order to apply a relatively narrow bead of adhesive.

* * * * *